United States Patent
Takagi (10) Patent No.: US 12,522,199 B2
(45) Date of Patent: Jan. 13, 2026

(54) CONTROL APPARATUS FOR VEHICLE

(71) Applicant: TOYOTA JIDOSHA KABUSHIKI KAISHA, Toyota (JP)

(72) Inventor: Kensuke Takagi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/399,287

(22) Filed: Dec. 28, 2023

(65) Prior Publication Data

US 2024/0217506 A1    Jul. 4, 2024

(30) Foreign Application Priority Data

Dec. 28, 2022    (JP) .................... 2022-212276

(51) Int. Cl.
*B60W 20/15*    (2016.01)
*B60W 10/08*    (2006.01)

(52) U.S. Cl.
CPC ............ *B60W 20/15* (2016.01); *B60W 10/08* (2013.01); *B60W 2710/083* (2013.01)

(58) Field of Classification Search
None
See application file for complete search history.

(56) References Cited

U.S. PATENT DOCUMENTS

| | | | |
|---|---|---|---|
| 2015/0226319 A1* | 8/2015 | Miyamoto | F16H 57/0413 701/58 |
| 2017/0259668 A1 | 9/2017 | Nomura et al. | |
| 2019/0193564 A1* | 6/2019 | Takagi | B60L 3/0061 |
| 2019/0285165 A1* | 9/2019 | Hashimoto | B60W 20/10 |
| 2024/0025383 A1* | 1/2024 | Treharne | B60T 8/323 |

FOREIGN PATENT DOCUMENTS

| | | |
|---|---|---|
| JP | H08290721 A | 11/1996 |
| JP | 2001058518 A | 3/2001 |
| JP | 2002257216 A | 9/2002 |
| JP | 2005030495 A | 2/2005 |
| JP | 2016165180 A | 9/2016 |
| JP | 2017159773 A | 9/2017 |

* cited by examiner

*Primary Examiner* — Navid Z. Mehdizadeh
*Assistant Examiner* — Jason R Roberson
(74) *Attorney, Agent, or Firm* — Hunton Andrews Kurth LLP (57) ABSTRACT

A control apparatus for a vehicle including: (i) an engine; (ii) an input rotary member connected to the engine; (iii) an electric transmission mechanism that includes a differential mechanism configured to receive a power of the engine via the input rotary member and an electric motor connected to the differential mechanism; and (vi) a mechanical oil pump configured, when being driven by rotation of the input rotary member, to supply an oil for lubricating the differential mechanism. The differential mechanism includes a first rotary element connected to the input rotary member, a second rotary element connected to the electric motor, and a third rotary element connected to drive wheel. The control apparatus is configured to execute an electric-motor stop control for stopping the electric motor, each time a cumulative time or a cumulative distance of a towed running of the vehicle reaches a predetermined time or distance.

5 Claims, 5 Drawing Sheets

CONTROL APPARATUS FOR VEHICLE

This application claims priority from Japanese Patent Application No. 2022-212276 filed on Dec. 28, 2022, the disclosure of which is herein incorporated by reference in its entirety.

FIELD OF THE INVENTION

The present invention relates to a control apparatus for a vehicle including an engine, an electric transmission mechanism and a mechanical oil pump.

BACKGROUND OF THE INVENTION

There is well known a control apparatus for a vehicle including: (i) a drive wheel; (ii) an engine; (iii) an input rotary member to which the engine is connected in a power transmittable manner; (iv) an electric transmission mechanism that includes (iv-1) a differential mechanism configured to receive a power of the engine via the input rotary member and (iv-2) an electric motor connected to the differential mechanism in a power transmittable manner, such that a differential state of the differential mechanism is controlled with an operation state of the electric motor being controlled; and (v) a mechanical oil pump configured, when being driven by rotation of the input rotary member, to supply an oil for lubricating the differential mechanism. For example, Patent Document 1 discloses a lubricating device for a vehicle. This Patent Document 1 discloses that an oil for lubricating a transmission mechanism is supplied by a mechanical oil pump when an engine is in an operation state, and that the oil for lubricating the transmission mechanism is supplied by driving an electric oil pump provided in a vehicle when the vehicle is towed with the engine being in a stop state.

PRIOR ART DOCUMENT

Patent Document

[Patent Document 1]
Japanese Patent Application Laid-Open No. 2002/257216

SUMMARY OF THE INVENTION

By the way, in a vehicle that does not include an electric oil pump, the lubrication of the transmission mechanism using the electric oil pump cannot be performed during a towed running with the engine being in a stop state. Therefore, in the vehicle that is not provided with the electric oil pump, when the vehicle continues to be towed for a long time or a long distance, there is a risk that an oil for lubricating the transmission mechanism could become insufficient.

The present invention has been made in view of the above circumstances, and an object thereof is to provide a control apparatus for a vehicle, which makes it possible to lubricate a transmission mechanism by using a mechanical oil pump during a towed running with an engine being in a stop state.

According to a first aspect of the present invention, there is provided a control apparatus for a vehicle including: (i) a drive wheel; (ii) an engine; (iii) an input rotary member to which the engine is connected in a power transmittable manner; (iv) an electric transmission mechanism that includes (iv-1) a differential mechanism configured to receive a power of the engine via the input rotary member and (iv-2) an electric motor connected to the differential mechanism in a power transmittable manner, such that a differential state of the differential mechanism is controlled with an operation state of the electric motor being controlled; and (v) a mechanical oil pump configured, when being driven by rotation of the input rotary member, to supply an oil for lubricating the differential mechanism, wherein the differential mechanism includes a first rotary element connected to the input rotary member in a power transmittable manner, a second rotary element to which the electric motor is connected in a power transmittable manner, and a third rotary element connected to the drive wheel. The vehicle is to be towed with the engine being in a stop state and with the drive wheel being grounded during a towed running. The control apparatus is configured to execute an electric-motor stop control for a predetermined time, each time a cumulative time of the towed running reaches a predetermined time, or each time a cumulative distance of the towed running reaches a predetermined distance. When the electric-motor stop control is being executed, the electric motor is controlled such that rotation of the electric motor is stopped. Further, the differential mechanism is constructed such that a rotational speed of the first rotary element is between a rotational speed of the second rotary element and a rotational speed of the third rotary element.

According to the first aspect of the present invention, the motor stop control is executed for the predetermined time each time the cumulative time during the towed running in the state in which the engine is stopped and the drive wheel is grounded reaches the predetermined time or each time the cumulative distance during the towed running reaches the predetermined distance. Accordingly, in the differential mechanism, rotation of the second rotary element to which the electric motor is connected is stopped in a state in which the third rotary element connected to the drive wheel is rotated, so that the first rotary element connected to the input rotary member is rotated whereby the mechanical oil pump is rotationally driven. Thus, the transmission mechanism can be lubricated using the mechanical oil pump during the towed running in the engine stop state.

DETAILED DESCRIPTION OF PREFERRED EMBODIMENT

An embodiment of the present invention will be described in detail below with reference to the drawings.

Embodiment

Figure 1:
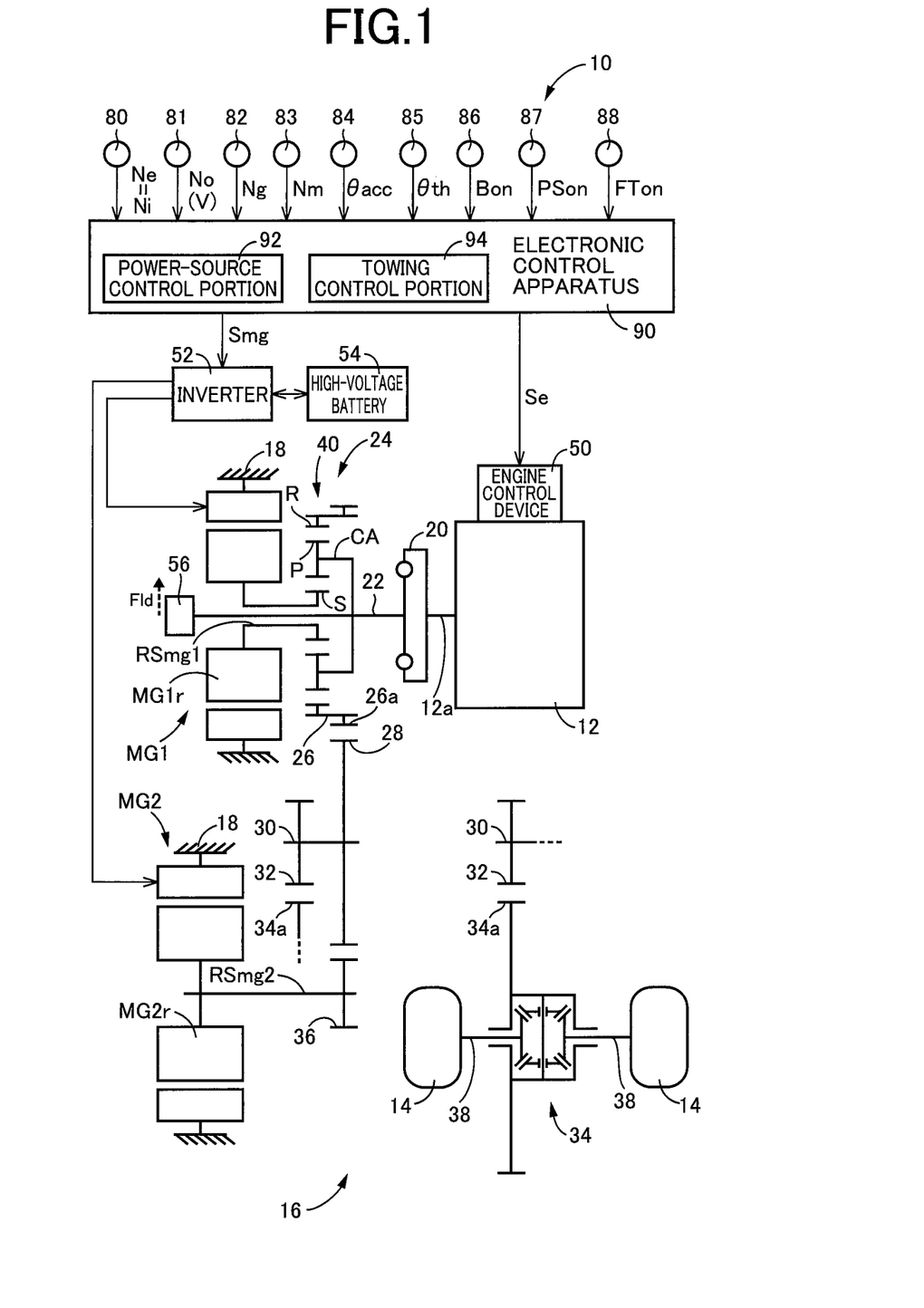
FIG. 1 is a view schematically showing a configuration of a vehicle to which the present invention is applied, and also a control function and a main part of a control system for various kinds of control in the vehicle.

FIG. 1 is a view schematically showing a configuration of a vehicle 10 to which the present invention is applied, and also a control function and a main part of a control system for various kinds of control in the vehicle 10. As shown in FIG. 1, the vehicle 10 includes an engine 12, a first electric motor MG1 and a second electric motor MG2. The vehicle 10 includes also drive wheels 14 and a power transmission device 16 provided in a power transmission path between the engine 12 and the drive wheels 14. The vehicle 10 is an electric vehicle, particularly, a hybrid electric vehicle, including the engine 12 and the second electric motor MG2, which function as power sources.

The engine 12 is a known internal combustion engine. In the engine 12, an engine torque Te which is a torque of the engine 12 is controlled by an engine control device 50 which is provided in the vehicle 10 and which is controlled by an electronic control apparatus 90 that will be described later.

Each of the first electric motor MG1 and the second electric motor MG2 is a rotary electric machine and is a so-called motor generator. The first electric motor MG1 and the second electric motor MG2 are connected to a high-voltage battery 54 provided in the vehicle 10 via an inverter 52 provided in the vehicle 10. The inverter 52 is controlled by the electronic control apparatus 90, such that an MG1 torque Tg as a torque of the first electric motor MG1 and an MG2 torque Tm as a torque of the second electric motor MG2 are controlled. The first electric motor MG1 and the second electric motor MG2 are provided in a casing 18 attached to a body of the vehicle 10.

The power transmission device 16 includes, in a casing 18, a damper 20, an input shaft 22, a transmission portion 24, a composite gear 26, a driven gear 28, a driven shaft 30, a final gear 32, a differential gear 34 and a reduction gear 36. The power transmission device 16 includes a rotor shaft RSmg1 integrally connected to a rotor MG1r of the first electric motor MG1 and a rotor shaft RSmg2 integrally connected to a rotor MG2r of the second electric motor MG2 in the casing 18. The power transmission device 16 further includes a pair of drive shafts 38 connected to the differential gear 34.

The input shaft 22 functions as an input rotary member of the transmission portion 24, and is connected to a crankshaft 12a of the engine 12 via the damper 20 and other elements. The input shaft 22 is an input rotary member to which the engine 12 is connected in a power transmittable manner, and is configured to receive a power from the engine 12. The transmission portion 24 is connected to the input shaft 22. The compound gear 26 is a rotary body that is an output member of the transmission portion 24. A drive gear 26a is formed on a part of the outer circumferential surface of the composite gear 26. The drive gear 26a is an output-side rotary member of the transmission portion 24. The driven gear 28 meshes with the drive gear 26a. The driven gear 28 and the final gear 32 are fixed on the driven shaft 30, and are unrotatable relative to each other. The final gear 32 has a diameter smaller than that of the driven gear 28, and meshes with the differential-ring gear 34a of the differential-gear 34. The reduction gear 36 has a diameter smaller than that of the driven gear 28, and meshes with the driven gear 28. The rotor shaft RSmg2 is connected to the reduction gear 36, so that the second electric motor MG2 is connected to the reduction gear 36 in a power transmittable manner.

The power transmission device 16 transmits the power outputted from the engine 12 to the driven gear 28 via the transmission portion 24. Further, the power transmission device 16 transmits a power outputted from the second electric motor MG2 to the driven gear 28 via the reduction gear 36. The power transmission device 16 transmits the power transmitted to the driven gear 28 to the drive wheels 14 sequentially via the driven shaft 30, the final gear 32, the differential gear 34 and the drive shaft 38, for example.

The transmission portion 24 includes the first electric motor MG1, the rotor shaft RSmg1 and a planetary gear device 40. The planetary gear device 40 is a known single-pinion planetary gear device including a sun gear S, a carrier CA, a ring gear R and pinions P. The sun gear S is connected to the rotor shaft RSmg1 in a power transmittable manner. In other words, the first electric motor MG1 is connected to the sun gear S in a power transmittable manner. The carrier CA is connected to the input shaft 22 in a power transmittable manner. That is, the engine 12 is connected to the carrier CA in a power transmittable manner via the input shaft 22, for example. The ring gear R is formed on a part of the inner circumferential surface of the composite gear 26, and is integrally connected to the drive gear 26a. That is, the ring gear R is connected to the drive wheels 14 in a power transmittable manner. The pinions P are supported by the carrier CA so as to be rotatable and revolvable. The ring gear R meshes with the sun gear S via the pinions P.

The planetary gear device 40 functions as a differential mechanism configured to produces a differential effect. The power of the engine 12 is inputted to the planetary gear device 40 via the input shaft 22. The first electric motor MG1 is an electric motor that is connected to the planetary gear device 40 in a power transmittable manner. The planetary gear device 40 is a power distribution mechanism configured to mechanically distribute the power of the engine 12 to the first electric motor MG1 and the drive gear 26a. The transmission portion 24 is a known electric transmission mechanism in which a differential state of the planetary gear device 40 is controlled with an operation state of the first electric motor MG1 being controlled.

The vehicle 10 further includes a mechanical oil pump 56. In this embodiment, the mechanical oil pump 56 is referred to as an MOP 56. The MOP 56 is connected to the input shaft 22 in a power transmittable manner. The MOP 56 is to be rotationally driven by the engine 12 so as to supply an oil Fld used for lubrication and cooling of each part of the power transmission device 16. That is, the MOP 56 is driven by the rotation of the input shaft 22 to supply the oil Fld that lubricates the planetary gear device 40, for example.

Figure 2:
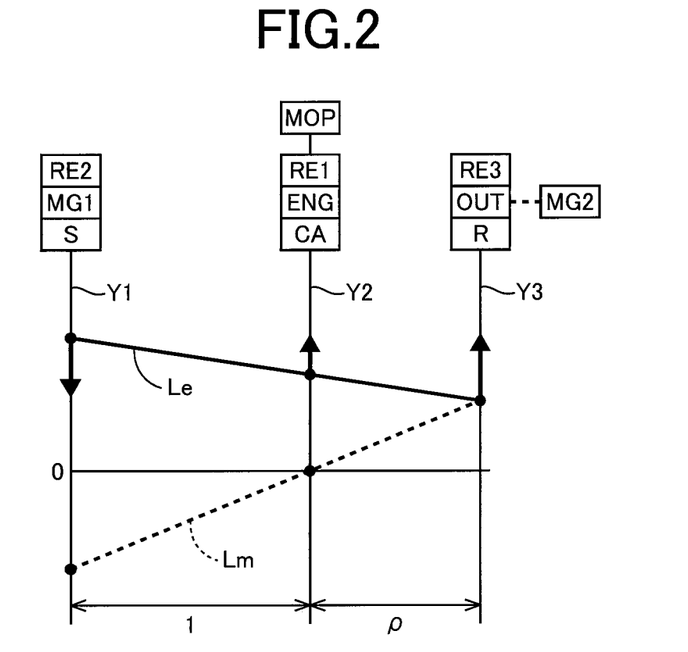
FIG. 2 is a collinear chart showing a relative relationship among rotational speeds of respective rotary elements in a transmission portion.

FIG. 2 is a collinear chart showing a relative relationship among rotational speeds of rotary elements in the transmission portion 24. In FIG. 2, three vertical lines Y1, Y2, Y3 correspond to the three rotary elements of the planetary gear device 40 constituting the transmission portion 24. The vertical line Y1 represents the rotational speed of the sun gear S corresponding to the second rotary element RE2 to which the first electric motor MG1 (see "MG1" in FIG. 2) is connected in a power transmittable manner. The vertical line Y2 represents the rotational speed of the carrier CA corresponding to the first rotary element RE1 to which the engine 12 is connected in a power transmittable manner. The MOP 56 (see "MOP" in FIG. 2) is connected to the input shaft 22 to which the engine 12 is connected in a power transmittable manner. The vertical line Y3 represents the rotational speed of the ring gear R corresponding to the third rotary element RE3 that integrally connected to the drive gear 26a (see "OUT" in FIG. 2). As shown in FIG. 2, the planetary gear device 40 as the differential mechanism is constructed such that the rotational speed of the carrier CA as the first rotary element RE1 is between the rotational speed of the sun gear S as the second rotary element RE2 and the rotational speed of the ring gear R as the third rotary element RE3. The second electric motor MG2 (see "MG2" in FIG. 2) is connected to the driven gear 28 meshing with the drive gear 26a via the reduction gear 36, for example, in a power transmittable manner. Intervals among the vertical lines Y1, Y2, Y3 are dependent on a gear ratio ρ (=number of teeth of the sun gear/number of teeth of the ring gear) of the planetary gear device 40. When the distance between the sun gear and the carrier is set to an interval corresponding to "1" in the relationship among the vertical axes of the collinear chart, the distance between the carrier and the ring gear is set to an interval corresponding to the gear ratio ρ.

In the transmission portion 24, the relationship between the rotational speed of the sun gear S and the rotational speed of the ring gear R is indicated by straight lines Le, Lm that intersect the vertical line Y2. The solid line Le in FIG. 2 indicates an example of relative speeds of the rotary elements during a forward running in an HEV running mode that is a running mode enabling an engine running, i.e., hybrid running (=HEV running), in which at least the engine 12 is used as a power source. In the HEV running mode, when a reaction torque, i.e., a negative torque from the first electric motor MG1, is inputted in positive rotation to the sun gear S with respect to the engine torque Te inputted to the carrier CA in the differential mechanism 34, an engine direct transmission torque Td [=Te/(1+ρ0)=−(1/ρ0)×Tg] appears in the ring gear R as a positive torque in positive rotation. In accordance with a required drive torque Trdem, a sum of the engine direct transmission torque Td and the MG2 torque Tm is transmitted to the drive wheels 14 as the drive torque Tr in the forward direction of the vehicle 10. In this instance, the transmission portion 24 can be operated as an electrically controlled continuously variable transmission in which the gear ratio γ (=input rotational speed Ni/output rotational speed No) is continuously variable. The input rotational speed Ni is a rotational speed of the input shaft 22, and is the same value as the engine rotational speed Ne that is a rotational speed of the engine 12. The output rotational speed No is a rotational speed of the drive gear 26a.

The broken line Lm in FIG. 2 indicates an example of relative speeds of the rotary elements during a forward running in a BEV running mode that is a running mode enabling a motor running (=BEV running) in which running of the vehicle 10 is performed using the second electric motor MG2 as the power source in a state in which operation of the engine 12 is stopped. In the BEV running mode, the first electric motor MG1 is in a no-load state and is idled in a negative direction, and the carrier CA is set to 0 rotation, that is, the engine rotational speed Ne is set to 0. In this state, only the second electric motor MG2 is used as the power source, and the MG2 torque Tm, which becomes a positive torque by the positive rotation transmitted to the driven gear 28, is transmitted to the drive wheels 14 as the drive torque Tr in the forward direction of the vehicle 10.

Figure 3:
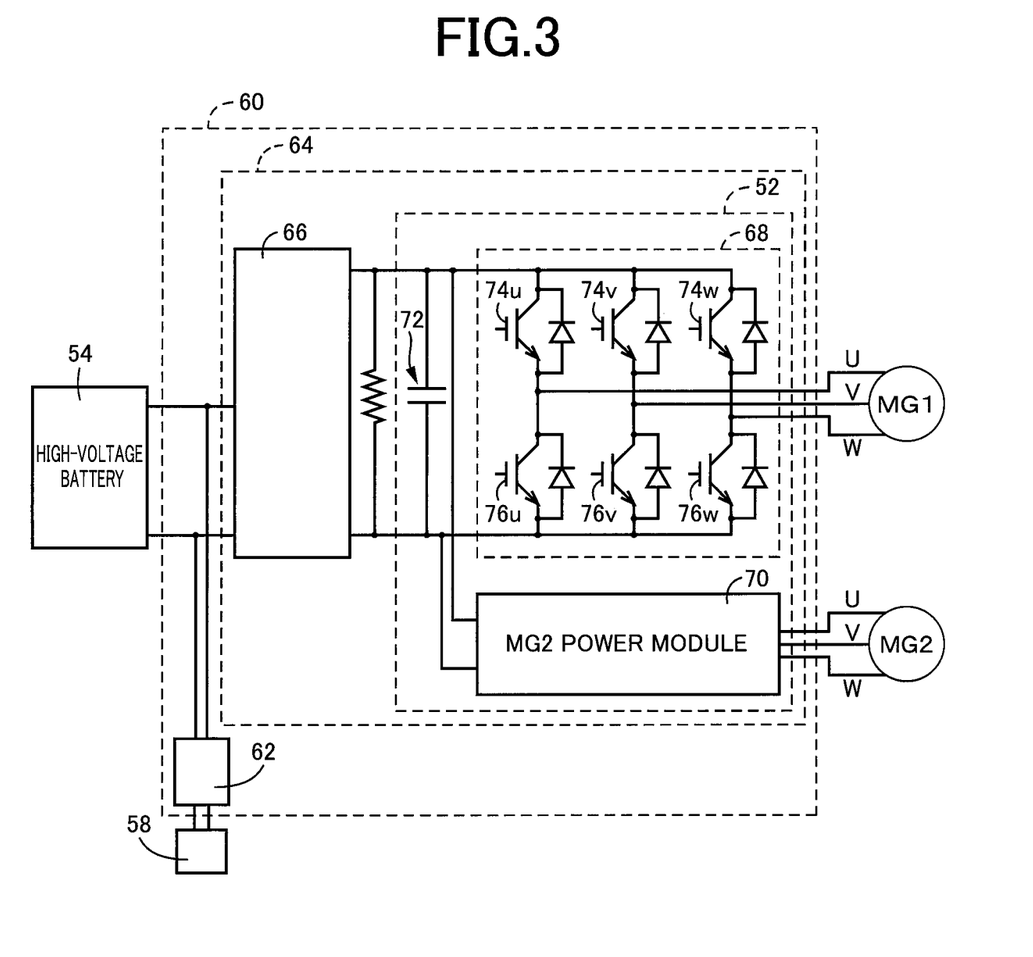
FIG. 3 is a view showing an example of an electrical configuration of an electric circuit unit.

FIG. 3 is a view showing an example of an electrical configuration of an electric circuit unit 60 including the inverter 52 provided in the vehicle 10. As shown in FIG. 3, the vehicle 10 further includes an auxiliary battery 58 in addition to the high-voltage battery 54. The electric circuit unit 60 controls the first electric motor MG1 and the second electric motor MG2.

The high-voltage battery 54 is a chargeable and dischargeable DC power supply, and is a secondary battery such as a nickel-hydrogen secondary battery or a lithium-ion battery. The high-voltage battery 54 is connected to the electric circuit unit 60.

The stored electric power is supplied from the high-voltage battery 54 to the first electric motor MG1 and the second electric motor MG2 via the electric circuit unit 60. The electric power generated by a power generation control of the first electric motor MG1 and the electric power generated by a regeneration control of the second electric motor MG2 are supplied to the high-voltage battery 54 via the electric circuit unit 60. The high-voltage battery 54 is a battery for driving the vehicle 10.

The electric circuit unit 60 includes a DC-DC converter 62 and a power control circuit 64.

The DC-DC converter 62 is connected to the high-voltage battery 54. The DC-DC converter 62 functions as a charging device that reduces the voltage of the high-voltage battery 54 to a voltage equivalent to that of the auxiliary battery 58 and charges the auxiliary battery 58. The auxiliary battery 58 supplies the electric power for operating auxiliary devices provided in the vehicle 10. The auxiliary battery 58 supplies the electric power for operating the electronic control apparatus 90, for example.

The power control circuit 64 includes a boost converter 66 and the inverter 52. The power control circuit 64 controls the electric power exchanged between the high-voltage battery 54 and each of the first electric motor MG1 and the second electric motor MG2.

The boost converter 66 is a buck-boost circuit having a function of boosting the voltage of the high-voltage battery 54 and supplying the boosted voltage to the inverter 52, and a function of bucking the voltage converted into a direct current by the inverter 52 and supplying the bucked voltage to the high-voltage battery 54.

The inverter 52 includes an MG1 power module 68, a MG2 power module 70 and a capacitor 72. The MG1 power module 68 includes transistors 74u, 74v, 74w, 76u, 76v, 76w. In this embodiment, the transistors 74u, 74v, 74w will be referred to as transistors 74, and the transistors 76u, 76v, 76w will be referred to as transistors 76, unless otherwise specified. The MG1 power module 68 constitutes a three-phase bridge circuit of an U-phase, a V-phase and a W-phase, by the transistors 74, 76, for example. The transistors 74, 76 are turned ON and OFF as switching elements to convert a DC current into a three-phase AC current. The transistors 74 constitute upper arms of the transistors 74, 76. The transistors 76 constitute lower arms of the transistors 74, 76. Since the MG2 power module 70 has the same configuration as the MG1 power module 68, the MG2 power module 70 is not described herein. Each of the first and second electric motors MG1, MG2 is a three-phase alternating-current synchronous motor that is to be driven by inverter 52 having a plurality of switching elements.

The inverter 52 converts the direct current from the boost converter 66 into an alternating current for driving the first electric motor MG1 and the second electric motor MG2. The inverter 52 converts the alternating current generated by the first electric motor MG1 using the power of the engine 12 and the alternating current generated by the second electric motor MG2 using the regenerative braking, into the direct current. The invertor 52 supplies the alternating current generated by the first electric motor MG1 as a power for driving the second electric motor MG2 depending on a running state of the vehicle 10.

Referring back to FIG. 1, the vehicle 10 includes the electronic control apparatus 90 as a controller including a control apparatus of the vehicle 10 related to various controls of the engine 12 and the electric motors, for example. The electronic control apparatus 90 includes, for example, a so-called microcomputer including a CPU, a RAM, a ROM and an input/output interface. The electronic control apparatus 90 performs the various controls in the vehicle 10, by the CPU performing signal processing in accordance with programs pre-stored in the ROM while using a temporary storage function of the RAM.

The electronic control apparatus 90 is supplied with various signals (e.g., engine rotational speed Ne (=input rotational speed Ni), output rotational speed No corresponding to vehicle running speed V, MG1 rotational speed Ng of the first electric motor MG1, MG2 rotational speed Nm of the second electric motor MG2, accelerator opening degree θacc, throttle-valve opening degree θth, brake-ON signal Bon, power-switch signal PSon and toeing-ON signal FTon) based on detection values supplied from various sensors provided in the vehicle 10 (e.g., engine speed sensor 80, output speed sensor 81, MG1 speed sensor 82, MG2 speed sensor 83, accelerator opening degree sensor 84, throttle-valve opening degree sensor 85, brake switch 86, power switch 87 and toeing selection switch 88).

The power switch 87 is a switch that is to be operated by a driver of the vehicle 10 so as to switch a vehicle-power supply state, i.e., a supply state of power in the vehicle 10. The power switch 87 is, for example, a momentary-type push button switch, and is to be pushed to a switch-ON position by the driver. Each time the power switch 87 is pushed to the switch-ON position, the power switch 87 outputs a power switch signal PSon corresponding to the switch-ON position.

The electronic control apparatus 90 detects the operation of the power switch 87 by the driver based on the power switch signal PSon. The operation of the power switch 87 by the driver is a vehicle-power supply operation for switching the vehicle-power supply state. The electronic control apparatus 90 switches the vehicle-power supply state in accordance with the power switch signal Pson and the brake-ON signal Bon, for example.

The vehicle-power supply state includes, for example, an off (="OFF") state, an accessory-ON (="ACC") state, an ignition-ON (="IG-ON") state and a ready-ON (="READY-ON") state. The OFF state is, for example, a power supply state for disabling running of the vehicle 10 and also disabling some functions not related to the running of the vehicle 10. The ACC state is a power supply state in which, for example, a combination meter (not shown) is turned OFF to disable the running of the vehicle 10 but to enable some functions not related to the running of the vehicle 10. The IG-ON state is, for example, a power supply state for turning ON the combination meter to enable control of functions other than control of the running of the vehicle 10. The IG-ON state is a power supply state in which the drive torque Tr cannot be generated, i.e., a power supply state in which the vehicle 10 cannot start or run even if the accelerator is turned ON. That is, the IG-ON state is a predetermined power supply state in which the engine 12 cannot be brought into an operated state and the vehicle 10 cannot be driven. The READY-ON state is, for example, a power supply state for turning ON the combination meter to enable the running of vehicle 10. That is, the READY-ON state is a power supply state in which the running of the vehicle 10 can be controlled, and is a power supply state in which the vehicle 10 can start and run when the accelerator is turned ON.

The towing selection switch 88 is a switch that is to be operated by the driver to select a flat towing mode. The flat-towing mode is a driving mode of the vehicle 10 corresponding to a towed running in which the vehicle 10 is towed. The towed running in the flat towing mode is, for example, a flat towing in which the vehicle 10 is towed in a state in which the engine 12 is stopped and all the wheels of the vehicle 10 are grounded. The flat towing is used, for example, in a situation in which the vehicle 10 is connected to a camping car or a motor home and is moved, and is also referred to as "four-down towing", "dinghy towing", "recreational towing" or the like. The towing selection switch 88 is, for example, a dial-type changeover switch, and outputs the towing-ON signal FTon when being switched to a flat-towing selection position by the driver.

Various command signals (for example, an engine control command signal Se for controlling the engine 12, an MG control command signal Smg for controlling each of the first electric motor MG1 and the second electric motor MG2) are outputted from the electronic control apparatus 90 to respective devices (for example, the engine control device 50, the inverter 52) provided in the vehicle 10.

The electronic control apparatus 90 includes power-source control means in the form of a power-source control portion 92, and towing control means in the form of a towing control portion 94, in order to realize various controls in the vehicle 10.

The power-source control portion 92 has an engine control function of controlling the operation of the engine 12 and a motor control function of controlling the operations of the first electric motor MG1 and the second electric motor MG2 via the inverter 52.

The power-source control portion 92 calculates a drive request amount for the vehicle 10 by the driver, for example, by applying the accelerator opening degree θacc and the vehicle running speed V to a drive request amount map. The drive demand amount map is for obtaining the drive demand amount, and is a predetermined relationship which is obtained by experimentation or determined by an appropriate design theory and which is stored in advance. The drive request amount is, for example, a drive torque Tr requested to the vehicle 10, that is, a requested drive torque Trdem [Nm] of the drive wheels 14. In other words, the requested drive torque Trdem is a requested drive power Prdem [W] at the vehicle running speed V at that time. A requested drive force Frdem [N] of the driving wheels 14 may be used as the requested drive force.

The power-source control portion 92 outputs the engine control command signal Se and the MG control command signal Smg so as to realize the required drive power Prdem in consideration of, for example, a transmission loss and an auxiliary device load. For example, the engine control command signal Se is a command value of the engine power Pe that is the power of the engine 12 that outputs the engine torque Te at the engine rotational speed Ne at that time, in consideration of an engine optimum fuel consumption point, for example. The MG control command signal Smg is a command value of a generated power Wg of the first electric motor MG1 that outputs the MG1 torque Tg at the MG1 rotational speed Ng at the time of outputting the command as the reaction torque of the engine torque Te. The MG control command signal Smg is a command value of a power consumption Wm of the second electric motor MG2 that outputs the MG2 torque Tm at the MG2 rotational speed Nm at the time of outputting the command of the generated power Wg. The engine optimum fuel consumption point is determined in advance as an engine operation point at which a total fuel efficiency of the vehicle 10 is maximized in consideration of, for example, a charge/discharge efficiency of the high-voltage battery 54 and a transmission efficiency of the power transmission device 16, for example, in addition to the fuel consumption of the engine 12 alone.

The power-source control portion 92 sets the running mode of vehicle 10 to the BEV running mode when the requested drive power Prdem is in a BEV running region, namely, when the requested drive power Prdem is smaller than a predetermined threshold value. On the other hand, the power-source control portion 92 sets the running mode of the vehicle 10 to the HEV running mode when the required drive power Prdem is in a HEV running region, namely, when the requested drive power Prdem is not smaller than the predetermined threshold value. However, even when the required drive power Prdem is in the BEV running region, the power-source control portion 92 establishes the HEV running mode when the high-voltage battery 54 needs to be charged or when the engine 12 and other elements need to be warmed up.

When the toeing-ON signal FTon is outputted, the towing control portion 94 turns ON a flag of the flat towing mode. When the flag of the flat towing mode is turned ON, the towing control portion 94 sets the vehicle power supply state to the IG-ON state and sets the transmission portion 24 to a neutral state. The flat towing is performed in the neutral state of the transmission portion 24. The neutral state of the transmission portion 24 is realized by, for example, causing the first electric motor MG1 to idle in a no-load state so as not to take a reaction torque with respect to the engine torque Te, whereby the transmission portion 24 is brought into a state in which the engine torque Te cannot be transmitted.

When the flat towing is being performed, the drive gear 26a is rotated with the rotation of the drive wheels 14, so that it is necessary to lubricate the planetary gear device 40 and other elements. On the other hand, when the flat towing is being performed, the engine 12 is in a stop state and the input shaft 22 is not rotated, the MOP 56 is not driven and the oil Fld that lubricates the planetary gear device 40 and other elements is not supplied. Further, when flat towing is being performed, the vehicle power supply state is set to the IG-ON state, so that the engine 12 cannot be started. Therefore, in a case where the vehicle 10 is not provided with an electric oil pump, there is a possibility that the oil Fld for lubricating the planetary gear device 40 and other elements becomes insufficient when the vehicle 10 continues to run in the flat towing mode for a long time or a long distance.

During the flat towing, the transmission portion 24 is in the neutral state, and the drive gear 26a is rotated by the rotation of the drive wheels 14. Therefore, if the first electric motor MG1 is controlled so as to stop the rotation of the first electric motor MG1 during the flat towing, the input shaft 22 can be rotated to drive the MOP 56.

During the flat towing, the towing control portion 94 outputs the MG control command signal Smg for executing an electric-motor stop control for controlling the first electric motor MG1 so as to stop the rotation of the first electric motor MG1, namely, outputs the MG control command signal Smg for executing an MG1 stop control CTstmg1. The towing control portion 94 executes the MG1 stop control CTstmg1 for a predetermined time TMf at a predetermined interval IVf during the flat towing. The predetermined time TMf is, for example, a predetermined control time for sufficiently supplying the oil Fld for lubricating the planetary gear device 40 and other elements.

The predetermined interval IVf is, for example, each time a cumulative time TMcnt of the flat towing reaches a predetermined time TMcntf, or each time a cumulative distance DTcnt of the flat towing reaches a predetermined distance DTcntf. The cumulative time TMcnt may be interpreted to mean a cumulative time for which the flat towing has been performed. The cumulative distance DTcnt may be interpreted to mean a cumulative distance by which the vehicle 10 has run by performance of the flat towing. A time when the flat towing is performed is, for example, when the vehicle 10 runs in a state in which the flat towing mode is selected, namely, in a state in which the flat towing mode is ON. Alternatively, the time when the flat towing is performed is, for example, when the vehicle 10 runs in substantially in the same vehicle state as running in the flat towing mode, namely, in a state in which the vehicle-power supply state is the IG-ON state and the running speed V exceeds a predetermined speed Vf. The predetermined speed Vf is, for example, a predetermined lower limit value for determining that the vehicle 10 is being moved by the flat towing.

The cumulative time TMcnt is a numerical value obtained by measuring a running time of the flat towing, i.e., a duration time count. The cumulative distance DTcnt is a numerical value obtained by measuring a running distance of the flat towing, i.e., a continuous distance count. The predetermined time TMcntf and the predetermined distance DTcntf are predetermined thresholds for determining that it is necessary to lubricate the planetary gear device 40 and other elements, for example. After the execution of the MG1 stop control CTstmg1, the towing controller 94 clears the cumulative time TMcnt to reset the cumulative time TMcnt to 0, and clears the cumulative distance DTcnt to reset the cumulative distance DTcnt to 0.

The MG1 stop control CTstmg1 is, for example, a MG1 three-phase ON control CTonmg1, i.e., a three-phase ON control in the MG1 power module 68 of the inverter 52. The towing controller 94 executes the MG1 three-phase ON control CTonmg1 by controlling the inverter 52 to turn ON all of the upper arms (transistors 74) of the transistors 74, 76 and to turn OFF all of the lower arms (transistors 76) of the transistors 74, 76. Alternatively, the towing controller 94 executes the MG1 three-phase ON control CTonmg1 by controlling the inverter 52 to turn OFF all of the upper arms of the transistors 74, 76 and to turn ON all of the lower arms of the transistors 74, 76. When the MG1 three-phase ON control CTonmg1 is executed while the first electric motor MG1 is rotating, the first electric motor MG1 generates a drag torque, so that the rotation of the first electric motor MG1 is stopped. The drag torque of the first electric motor MG1 is a torque acting in a direction for reducing an absolute value of the MG1 rotational speed Ng.

Figure 4:
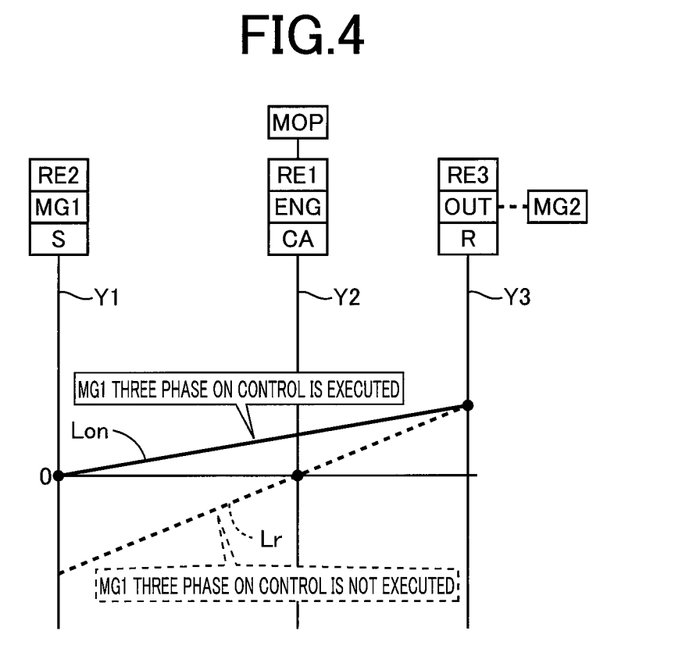
FIG. 4 is a view for explaining an MG1 three-phase ON control.

FIG. 4 is a view showing the MG1 three-phase ON control CTonmg1. FIG. 4 shows examples of execution and non-execution of the MG1 three-phase ON control CTonmg1, in a collinear chart similar to that of FIG. 2. In FIG. 4, a broken line Lr indicates an example of relative speeds of the rotary elements in the flat towing during the non-execution of the MG1 three-phase ON control CTonmg1. When the MG1 three-phase ON control CTonmg1 is not executed, the first electric motor MG1 is idled in a no-load state, so that the rotation of the carrier CA, i.e., the rotation of the input shaft 22 is stopped. On the other hand, a solid line Lon indicates an example of the relative speeds of the rotary elements in the flat towing during execution of the MG1 three-phase ON control CTonmg1. When the MG1 three-phase ON control CTonmg1 is executed, the first electric motor MG1 that has been idled generates a drag torque, and the rotation of the first electric motor MG1 is changed to be stopped. As a result, the input shaft 22 is rotated and the MOP 56 is driven, so that the oil Fld for lubricating the planetary gear device 40 and other elements is supplied.

The MG1 three-phase ON control CTonmg1 is a control for decelerating the first electric motor MG1 by generating a braking torque caused by a counter-electromotive force of the rotating first electric motor MG1, and is not a control for outputting a positive torque or a negative torque as the MG1 torque Tg. The MG1 three-phase ON control CTonmg1 is not a control for outputting a torque for cranking the engine 12 by the first electric motor MG1. Therefore, the MG1 three-phase ON control CTonmg1 can be executed even in a state in which the high-voltage battery 54 is disconnected from the electric circuit unit 60 by a relay (not shown). When the vehicle power supply state is the IG-ON state, for example, the high-voltage battery 54 is disconnected from the electric circuit unit 60 by the relay (not shown).

Figure 5:
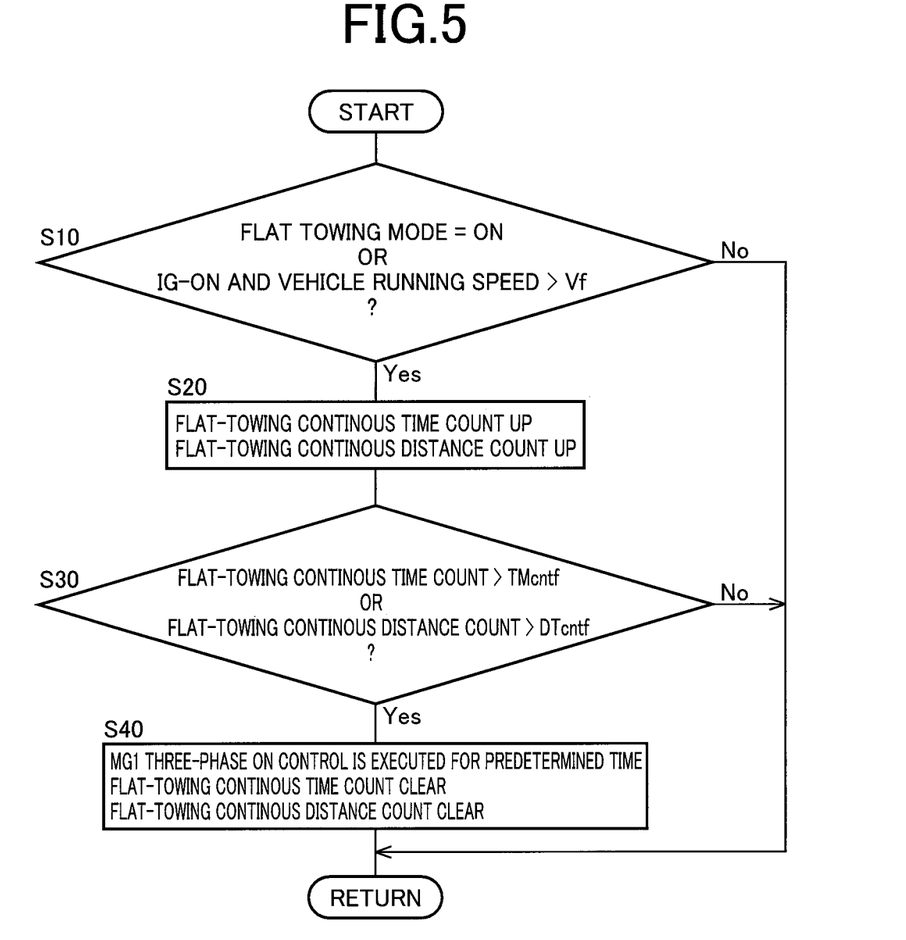
FIG. 5 is a flowchart showing a main part of a control operation of the electronic control apparatus, and also a control operation for lubricating a planetary gear device and other elements by using an MOP during a flat towing.

FIG. 5 is a flowchart showing a main part of a control operation of the electronic control apparatus 90, and also a control operation for lubricating the planetary gear device 40 and other elements by using the MOP 56 during the flat towing. A control routine of FIG. 5 is executed in a repeated manner, for example.

In the control routine of FIG. 5, each step corresponds to function of the towing control portion 94. The control routine is initiated with step S10 that is implemented to determine whether or not the flat towing mode is ON, or determine whether or not the vehicle power supply state is the IG-ON state and the vehicle running speed V exceeds a predetermined speed Vf. When a negative determination is made at step S10, one cycle of execution of the control routine is terminated. When an affirmative determination is made at step S10, the cumulative time TMcnt as a continuous time count of the flat towing is updated and the cumulative distance DTcnt as a continuous distance count of the flat towing are updated at step S20. Next, at step S30, it is determined whether or not the cumulative time TMcnt exceeds the predetermined time TMcntf, or whether or not the cumulative distance DTcnt exceeds the predetermined distance DTcntf. When a negative determination is made at step S30, one cycle of execution of the control routine is terminated. When an affirmative determination is made at step S30, step S40 is implemented to execute the MG1 three-phase ON control CTonmg1 for the predetermined time TMf. Further, the cumulative time TMcnt and the cumulative distance DTcnt are cleared.

As described above, the MG1 stop control CTstmg1 is executed for the predetermined time TMf each time the cumulative time TMcnt during the flat towing reaches the predetermined time TMcntf or each time the cumulative distance DTcnt during the flat towing reaches the predetermined distance DTcntf. Accordingly, in the planetary gear device 40, the rotation of the second rotary element RE2 is stopped in a state in which the third rotary element RE3 is rotated, so that the first rotary element RE1 is rotated whereby the MOP 56 is rotationally driven. Therefore, the planetary gear device 40 and other elements can be lubricated using the MOP 56 during the flat towing.

According to the present embodiment, the flat towing is performed in the neutral state of the transmission portion 24 in which the first electric motor MG1 is idled in the no-load state. As a result, the flat towing is appropriately performed. In addition, the MOP 56 is rotationally driven by the MG1 stop control CTstmg1 executed during the flat towing.

Further, according to the present embodiment, the time when the flat towing is performed is the time when the vehicle 10 runs in the state where the vehicle power supply state is the IG-ON state and the vehicle speed V exceeds the predetermined vehicle speed Vf, or the time when the vehicle 10 runs in the state where the flat towing mode is selected. As a result, it is possible to lubricate the planetary gear device 40 and other elements using the MOP 56 during the flat towing.

Further, according to the present embodiment, since the MG1 stop control CTstmg1 is the MG1 three-phase ON control CTonmg1, the rotation of the first electric motor MG1 is appropriately stopped during the flat towing.

Although the embodiment of the present invention has been described in detail with reference to the drawings, the present invention is also applicable to other embodiments.

For example, in the above-described embodiment, the towed running of the vehicle 10 in which the MG1 stop control CTstmg1 is executed is not limited to the flat towing. For example, since the drive gear 26a is rotated also in a state in which driven wheels are not in contact with the ground and only the drive wheels 14 are in contact with the ground, it is necessary to lubricate the planetary gear device 40 and the like. Therefore, the towed running of the vehicle 10 in which the MG1 stop control CTstmg1 is to be executed may be a towed running in a state in which the engine 12 is stopped and the driving wheels 14 are grounded.

Further, in the above-described embodiment, the present invention can be applied to any vehicle provided with an electric transmission mechanism including a differential mechanism having at least three rotary elements.

It should be noted that the above-described embodiment is merely one embodiment, and the present invention can be implemented in a mode in which various changes and improvements are added based on the knowledge of those skilled in the art.

NOMENCLATURE OF ELEMENTS

10: vehicle
12: engine
14: drive wheel
22: input shaft (input rotary member)
24: transmission unit (electric transmission mechanism)
40: Planetary gear device (differential mechanism)
CA: carriers (RE1: first rotary elements)
S: sun gear (RE2: second rotary element)
R: ring gear (RE3: third rotary element)
52: inverter
56: mechanical oil pump
74 ($74u$, $74v$, $74w$): transistor (switching device, upper arm)
76 ($76u$, $76v$, $76w$): transistor (switching device, lower arm)
90: electronic control apparatus (control apparatus)
Fld: oil
MG1: first electric motor (motor)

What is claimed is:

1. A control apparatus for a vehicle including: (i) a drive wheel; (ii) an engine; (iii) an input rotary member to which the engine is connected in a power transmittable manner; (iv) an electric transmission mechanism that includes (iv-1) a differential mechanism configured to receive a power of the engine via the input rotary member and (iv-2) an electric motor connected to the differential mechanism in a power transmittable manner, such that a differential state of the differential mechanism is controlled with an operation state of the electric motor being controlled; and (v) a mechanical oil pump configured, when being driven by rotation of the input rotary member, to supply an oil for lubricating the differential mechanism, wherein the differential mechanism includes a first rotary element connected to the input rotary member in a power transmittable manner, a second rotary element to which the electric motor is connected in a power transmittable manner, and a third rotary element connected to the drive wheel, and the differential mechanism is constructed such that a rotational speed of the first rotary element is between a rotational speed of the second rotary element and a rotational speed of the third rotary element, wherein the vehicle is to be towed with the engine being in a stop state and with the drive wheel being grounded during a towed running, wherein the control apparatus is configured to count a cumulative time of the towed running and to count a cumulative distance of the towed running, wherein the control apparatus is configured to execute an electric-motor stop control for a control execution time, each time the cumulative time of the towed running reaches a predetermined time threshold, and each time the cumulative distance of the towed running reaches a predetermined distance threshold, and wherein, when the electric-motor stop control is being executed, the electric motor is controlled such that rotation of the electric motor is stopped, whereby the mechanical oil pump is rotationally driven by the rotation of the input rotary member connected to the first rotary element whose rotational speed is between the rotational speed of the second rotary element connected to the stopped electric motor and the rotational speed of the third rotary element connected to the grounded drive wheel.

2. The control apparatus according to claim 1,
wherein the towed running is performed in a neutral state of the electric transmission mechanism in which the electric motor is idled in a no-load state.

3. The control apparatus according to claim 1,
wherein a time when the towed running is performed is when the vehicle runs at a running speed higher than a predetermined speed, in a predetermined power supply state of the vehicle in which the engine cannot be operated and the vehicle cannot be driven, or when the vehicle runs in a state in which an operation mode corresponding to the towed running is selected.

4. The control apparatus according to claim 1,
wherein the towed running is a flat towing in which the vehicle is towed in a state in which all wheels of the vehicle are grounded.

5. The control apparatus according to claim 1,
wherein the electric motor is a three-phase AC electric motor that is to be driven by an inverter having a plurality of switching elements, and wherein the electric-motor stop control is a three-phase ON control that is to be executed to control the inverter so as to turn on all of upper arms of the switching elements or all of lower arms of the switching elements, whereby the three-phase AC electric motor is caused to generate a drag torque that acts in a direction for reducing an absolute value of a rotational speed of the three-phase AC electric motor.

\* \* \* \* \*